United States Patent
Lin et al.

(10) Patent No.: US 8,870,431 B2
(45) Date of Patent: Oct. 28, 2014

(54) LIGHT MIXING MODULE

(75) Inventors: Hui-Hsiung Lin, Miaoli County (TW);
Chiun-Lern Fu, Hsinchu County (TW);
Hsiao-Wen Hung, Kaohsiung (TW);
Wen-Hsun Yang, Taipei (TW);
Chi-Hung Liao, Tainan (TW);
Wen-Jung Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 134 days.

(21) Appl. No.: 13/331,053

(22) Filed: Dec. 20, 2011

(65) Prior Publication Data

US 2012/0170282 A1   Jul. 5, 2012

(30) Foreign Application Priority Data

Dec. 31, 2010   (TW) ................. 99147373 A
Nov. 7, 2011    (TW) ................. 100140605 A

(51) Int. Cl.

| | |
|---|---|
| *F21V 7/04* | (2006.01) |
| *G02F 1/1335* | (2006.01) |
| *F21V 8/00* | (2006.01) |
| *F21Y 105/00* | (2006.01) |
| *F21K 99/00* | (2010.01) |
| *F21Y 101/02* | (2006.01) |
| *F21V 5/00* | (2006.01) |

(52) U.S. Cl.
CPC .... *G02F 1/133602* (2013.01); *G02F 1/133606* (2013.01); *F21Y 2105/00* (2013.01); *F21K 9/56* (2013.01); *G02B 6/005* (2013.01); *F21Y 2101/02* (2013.01); *F21K 9/54* (2013.01); G20F 2001/133614 (2013.01); F21V 5/002 (2013.01); *G02B 6/0036* (2013.01)

USPC ........... 362/606; 362/608; 362/609; 362/610; 362/613; 362/620

(58) Field of Classification Search
USPC ......... 362/341, 600, 606, 608–610, 612, 613, 362/615, 617, 620, 623
See application file for complete search history.

(56) References Cited

U.S. PATENT DOCUMENTS 7,036,946 B1    5/2006   Mosier
2010/0002414 A1* 1/2010  Meir et al. ............. 362/84

FOREIGN PATENT DOCUMENTS

| EP | 2068193 A2 | 6/2009 |
| TW | M245446 | 10/2004 |

(Continued)

OTHER PUBLICATIONS

Chiu et a., A Study of Fabrication Phosphor Membrane with Even Exit Light, Journal of Technology, 2009, vol. 24, No. 3, pp. 221-226.

(Continued)

*Primary Examiner* — Meghan Dunwiddie
(74) *Attorney, Agent, or Firm* — Morris Manning & Martin LLP; Tim Tingkang Xia, Esq.

(57) ABSTRACT

A mixing light module includes a matrix, a fluorescent film, and a plurality of micro-structures. The matrix includes an incidence surface, an emission surface and a reflective surface. The fluorescent film disposed on or above the emission surface has an upper surface and a lower surface and includes a plurality of fluorescent particles. The matrix receives a first light having a first wavelength, and the reflective surface reflects the first light to make the first light to be emitted from the emission surface. Since the plurality of fluorescent particles receives a part of the first light from the emission surface, the plurality of fluorescent particles is excited to emit a second light having a second wavelength. The second light and the first light are mixed into a predetermined light. The plurality of micro-structures is used to make the first light or the second light uniform.

22 Claims, 12 Drawing Sheets

(56) References Cited

FOREIGN PATENT DOCUMENTS

| TW | M285714 | 1/2006 |
|---|---|---|
| TW | I253769 | 4/2006 |
| TW | 200619780 A | 6/2006 |
| TW | 200706988 A | 2/2007 |
| TW | M323061 | 12/2007 |
| TW | 200823557 | 6/2008 |
| TW | 200828622 | 7/2008 |
| TW | M338439 | 8/2008 |
| TW | 200933087 A | 8/2009 |
| TW | 201003240 | 1/2010 |

OTHER PUBLICATIONS

Tien et al., Planar Lighting by Blue LEDs Array with Remote Phosphor, Light-Emiting Diodes: Materials, Devices, and Applications for Solid State Lighting XIV, Proc. of SPINE, 2010, vol. 7617, pp. 761707-1—761707-8.

Shi et al., Research of Phosphors Coating Technique for Slim Backlight Unit of LCD, Journal of Shaanxi University of Science & Technology, 2008, vol. 26, No. 2, pp. 34-37.

Intellectual Property Office, Ministry of Economic Affairs, R.O.C., "Office Action", Mar. 20, 2014, Taiwan.

* cited by examiner

LIGHT MIXING MODULE

CROSS-REFERENCE TO RELATED APPLICATIONS

This non-provisional application claims priority under 35 U.S.C. §119(a) on Patent Application No(s). 099147373 filed in Taiwan, R.O.C. on Dec. 31, 2010 and Patent Application No(s). 100140605 filed in Taiwan, R.O.C. on Nov. 7, 2011, the entire contents of which are hereby incorporated by reference.

BACKGROUND

1. Technical Field

The technical field relates to a light mixing module.

2. Related Art

Currently, a light-emitting diode (LED) capable of producing a white light is mainly obtained in the following three methods. In the first method, an LED emitting a blue light is used to irradiate an yttrium aluminum garnet (YAG) to produce a yellow light complementary to the blue light. Then, the yellow light and the blue light complementary to each other are mixed by using the light scattering principle to obtain a white light. In the second method, a matrix made of zinc selenide (ZnSe) capable of emitting a yellow light is provided. Then, an epitaxial layer of ZnSe is grown on the matrix. The epitaxial layer of ZnSe actively emits a blue light when being electrified, the matrix emits a yellow light when being electrified, and the emitted blue light and yellow light are mixed to obtain a white light. In the third method, an LED emitting a UV light is used to irradiate fluorescent particles that can be excited to emit a red light, a green light, and a blue light, respectively, and the red light, the green light, and the blue light are mixed to obtain a white light.

In recent years, the LED capable of producing the white light is widely applied in illumination or backlight modules. Therefore, the development of such an LED draws attention worldwide, and attracts a great amount of investment in research and development around the world. However, the current LED capable of producing the white light is disadvantageous in excessively high fabrication cost and low luminous efficiency, which hold back the mass production and application promotion of the same.

SUMMARY

Accordingly, the present disclosure provides a light mixing module.

The light mixing module of the present disclosure is applied for receiving a first light which has a first wavelength. In an embodiment, the light mixing module includes a matrix, a fluorescent film, and a plurality of micro-structures. The matrix includes an incidence surface, an emission surface, and a reflective surface. The incidence surface and the emission surface are adjacent to each other. The reflective surface is opposite to the emission surface. The fluorescent film is disposed on or above the emission surface and has an upper surface and a lower surface which are opposite to each other. The fluorescent film includes a plurality of fluorescent particles. The plurality of micro-structures is disposed on a surface selected from the group consisting of the emission surface, the reflective surface, the upper surface, the lower surface, and combination thereof. The matrix receives the first light from the incidence surface, and the reflective surface is used for reflecting the first light received by the incidence surface to make the first light to be emitted from the emission surface. The plurality of fluorescent particles receives a part of the first light emitted by the emission surface, and the plurality of fluorescent particles is excited to emit a second light having a second wavelength. The second light and the first light are mixed into a predetermined light, and the predetermined light is a visible light. The plurality of micro-structures is used to make the first light or the second light uniform.

The light mixing module of the present disclosure is applied for receiving a first light which has a first wavelength. In an embodiment, the light mixing module includes a matrix, a fluorescent film, and a plurality of micro-structures. The matrix includes a first surface and a second surface which are opposite to each other. The fluorescent film is disposed on the first surface or the second surface, has an upper surface and a lower surface which are opposite to each other, and includes a plurality of fluorescent particles. The plurality of micro-structures is disposed on a surface selected from the group consisting of the first surface, the second surface, the upper surface, the lower surface, and combination thereof. The first surface is used to receive the first light, and the second surface is used to emit the first light received by the first surface. The plurality of fluorescent particles receives a part of the first light emitted by the second surface, and the plurality of fluorescent particles is excited to emit a second light having a second wavelength. The second light and the first light are mixed into a predetermined light, and the predetermined light is a visible light. The plurality of micro-structures is used to make the first light or the second light uniform.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
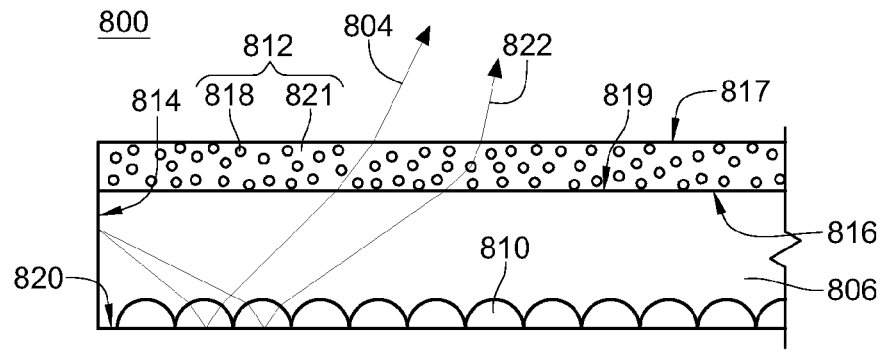
FIG. 1 is a schematic view of the structure of a light mixing module according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of the structure of a light mixing module according to one embodiment. The light mixing module 800 is applied for receiving a first light 804 which has a first wavelength $\lambda_1$. The light mixing module 800 includes a matrix 806, a plurality of micro-structures 810, and a fluorescent film 812. The matrix 806 includes an incidence surface 814, an emission surface 816, and a reflective surface 820. The incidence surface 814 is adjacent to the emission surface 816. The emission surface 816 and the reflective surface 820 are opposite to each other. The fluorescent film 812 is disposed on the emission surface 816, has an upper surface 817 and a lower surface 819 which are opposite to each other, and includes a plurality of fluorescent particles 818 and a colloid 821. In this embodiment, the plurality of micro-structures 810 is disposed on the reflective surface 820, and the present disclosure is not limited thereto. For example, the plurality of micro-structures 810 also can be disposed on a surface selected from the group consisting of the emission surface 816, the upper surface 817, the lower surface 819, and combination thereof.

The matrix 806 receives the first light 804 from the incidence surface 814, and the reflective surface 808 is used for reflecting the first light 804 received by the incidence surface 814 to make the first light 804 to be emitted from the emission surface 816. The plurality of fluorescent particles 818 receives a part of the first light 804 emitted by the emission surface 816, and the plurality of fluorescent particles 818 is excited to emit a second light 822 having a second wavelength $\lambda_2$. The second light 822 and the first light 804 are mixed into a predetermined light, a color of the predetermined light is associated with the first wavelength $\lambda_1$ and the second wavelength $\lambda_2$, and the predetermined light is a visible light. The plurality of micro-structures 810 is used to make the first light 804 uniform, and the present disclosure is not limited thereto. For example, when the plurality of micro-structures 810 is disposed on the upper surface 817, the plurality of micro-structures 810 is used to make the first light 804 and the second light 822 uniform. In other words, the plurality of micro-structures 810 can make the light which passes through the plurality of micro-structures 810 according to the disposition of the plurality of micro-structures 810, wherein the plurality of micro-structures 810 can be disposed on a surface selected from the group consisting of the emission surface 816, the reflective surface 820, the upper surface 817, the lower surface 819, and combination thereof.

Figure 2A:
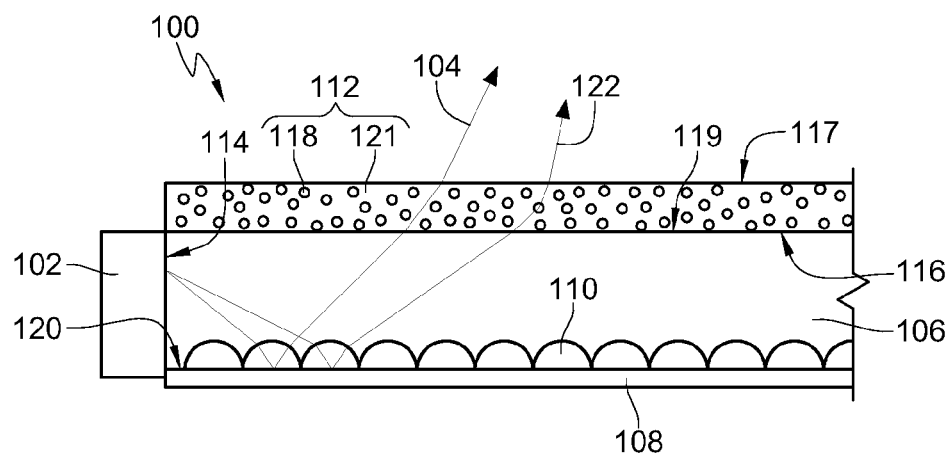
FIG. 2A is a schematic view of the structure of a light mixing module applied in a backlight module of a display device according to a first embodiment.

FIG. 2A is a schematic view of the structure of a light mixing module applied in a backlight module of a display device according to a first embodiment. The light mixing module 100 is applied for receiving a first light 104 having a first wavelength $\lambda_1$ emitted by a light source 102, and the light source 102 may be, but not limited to, a light-emitting diode (LED). The light mixing module 100 includes a matrix 106, a reflecting element 108, a plurality of micro-structures 110, and a fluorescent film 112. The matrix 106 includes an incidence surface 114, an emission surface 116, and a reflective surface 120. The fluorescent film 112 has an upper surface 117 and a lower surface 119, and includes a plurality of fluorescent particles 118. The reflecting element 108 is disposed on the reflective surface 120 opposite to the emission surface 116. The plurality of micro-structures 110 is disposed on the reflective surface 120, and the fluorescent film 112 is disposed on the emission surface 116 of the matrix 106. In this embodiment, the fluorescent film 112 is glued to the matrix 106 and the fluorescent film 112 is adhered to the emission surface 116. In this embodiment, the light mixing module 100 can use the reflecting element 108 which is disposed on the reflective surface 120 to reflect the first light 104 which is incident on the reflective surface 120, and the present disclosure is not limited thereto. For example, the light mixing module 100 which does not have the reflecting element 108 can use the refractive index of the matrix 106 and the refractive index of the external environment to totally reflect the first light 104 which is incident on the reflective surface 120.

In this embodiment, the light mixing module 100 is applicable to the backlight module (not shown) in the display device (not shown), but the present disclosure is not limited thereto. That is, the light mixing module 100 is also applicable to a white light illumination device.

In this embodiment, the plurality of micro-structures 110 can be disposed on the reflective surface 120, but the present disclosure is not limited thereto, which can be adjusted according to actual requirements. That is, the plurality of micro-structures 110 can also be disposed on the emission surface 116 (referring to FIG. 2B, which is a schematic view of the structure of a light mixing module applied in a backlight module of a display device according to a second embodiment), disposed on the emission surface 116 and the reflective surface 120 (referring to FIG. 2C, which is a schematic view of the structure of a light mixing module applied in a backlight module of a display device according to a third embodiment), disposed on the upper surface 117 and the lower surface 119 (referring to FIG. 2D, which is a schematic view of the structure of a light mixing module applied in a backlight module of a display device according to a fourth embodiment), disposed on the lower surface 119 (referring to FIG. 2E, which is a schematic view of the structure of a light mixing module applied in a backlight module of a display device according to a fifth embodiment), or disposed on the upper surface 117 (referring to FIG. 2F, which is a schematic view of the structure of a light mixing module applied in a backlight module of a display device according to a sixth embodiment). The plurality of micro-structures 110 may be, but not limited to, arc-top prisms. That is, the plurality of micro-structures 110 may be selected from a group consisting of micro-prisms, flat-top prisms, arc-top prisms, curved prisms, and irregular prisms.

Referring to FIG. 2A, the light source 102 is disposed beside the incidence surface 114 of the matrix 106, and the incidence surface 114 and the emission surface 116 are adjacent to each other. The first light 104 is incident from a side surface of the matrix 106, and emitted from the emission surface 116 of the matrix 106.

In this embodiment, the matrix 106 receives the first light 104 from the incidence surface 114, and transmits the first light 104. The reflecting element 108 is used for reflecting the first light 104 transmitted by the matrix 106, so that the first light 104 is emitted from the emission surface 116. The plurality of micro-structures 110 is used to make the first light 104 which is transmitted by the matrix 106 uniform, and makes the uniform first light 104 be emitted from the emission surface 116. The plurality of fluorescent particles 118 is excited by the part of the first light 104 emitted from the emission surface 116 to emit a second light 122 with a second wavelength $\lambda_2$.

Specifically, when the first light 104 emitted from the light source 102 is received by the light mixing module 100, the matrix 106 transmits the first light 104, the plurality of micro-structures 110 makes the first light 104 transmitted by the matrix 106 uniform, and the reflecting element 108 reflects the first light 104 transmitted by the matrix 106, so that the first light 104 is output from the emission surface 116. Thereby, the emission surface 116 outputs the uniform first light 104. Next, a part of the uniform first light 104 is received by the fluorescent film 112, and the plurality of fluorescent particles 118 in the fluorescent film 112 is excited by the part of the uniform first light 104 to emit the second light 122 with the second wavelength $\lambda_2$. It should be noted that, when the second light 122 with the second wavelength $\lambda_2$ passes through the plurality of micro-structures, the second light 122 can also be a uniform light. The second light 122 with the second wavelength $\lambda_2$ may be mixed with the first light 104 into a predetermined light, and the predetermined light is a visible light. In addition, when the color of the first light 104 is complementary to the color of the second light 122 (for example, but not limited to that, the first light 104 is a blue light, and the second light 122 is a yellow light), the light mixing module 100 emits a white light, but the present disclosure is not limited thereto, which can be adjusted according to actual requirements on the predetermined light.

Figure 3A:
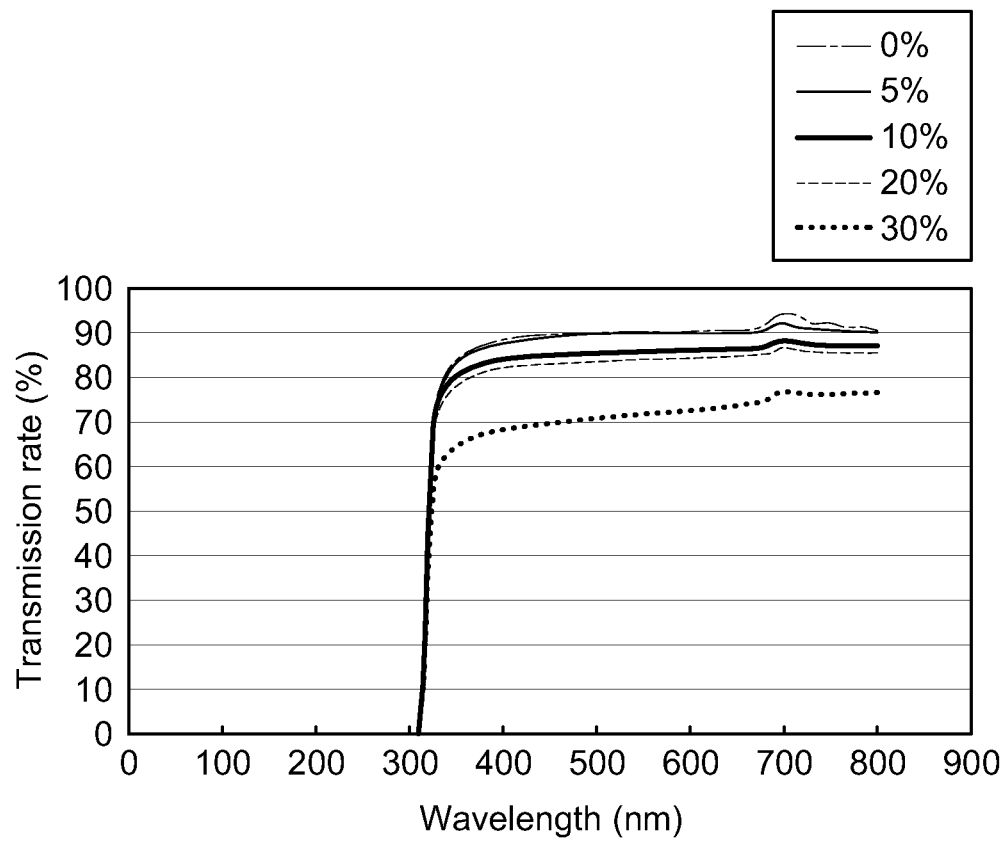
FIG. 3A is a schematic view of relations between a volume ratio of the plurality of fluorescent particles and a colloid and a transmission rate of a fluorescent film according to an exemplary embodiment.

In this embodiment, the fluorescent film 112 may be formed by a colloid 121 containing a specific proportion of the plurality of fluorescent particles 118. A volume ratio of the plurality of fluorescent particles 118 and the colloid 121 is associated with a transmission rate of the fluorescent film 112, and the specific proportion can be adjusted according to actual requirements. FIG. 3A is a schematic view of the relations between the volume ratio of the plurality of fluorescent particles and the colloid and the transmission rate of the fluorescent film according to an exemplary embodiment. The plurality of fluorescent particles 118 may be made of YAG, and the fluorescent film 112 may have a uniform thickness. In FIG. 3A, the transverse axis represents the wavelength of the first light 104 received by the light mixing module 100, and the longitudinal axis represents the transmission rate of the fluorescent film 112. The central line indicates that the volume ratio of the plurality of fluorescent particles 118 and the colloid 121 is zero, the fine line indicates that the volume ratio of the plurality of fluorescent particles 118 and the colloid 121 is 5%, the thick line indicates that the volume ratio of the plurality of fluorescent particles 118 and the colloid 121 is 10%, the dashed line indicates that the volume ratio of the plurality of fluorescent particles 118 and the colloid 121 is 20%, and the dotted line indicates that the volume ratio of the plurality of fluorescent particles 118 and the colloid 121 is 30%. It can be seen from FIG. 3A that, when the volume ratio of plurality of the fluorescent particles 118 and the colloid 121 is under 30% and the wavelength of the first light 104 received by the light mixing module 100 is in a range of 300 nm to 800 nm, the transmission rate of the fluorescent film 112 is above 60%. That is, when the light mixing module 100 receives the first light 104 of the same wavelength, the transmission rate of the fluorescent film 112 decreases along with the increase of the volume ratio of the plurality of fluorescent particles 118 and the colloid 121. Therefore, the volume ratio of the plurality of fluorescent particles 118 and the colloid 121 is, for example, greater than 0 and smaller than or equal to 30%. It should be noted that, when the color of the first light 104 is complementary to the color of the second light 122 (for example, but not limited to that, the first light 104 is a blue light, and the second light 122 is a yellow light), the light mixing module 100 emits a white light.

Figure 3B:
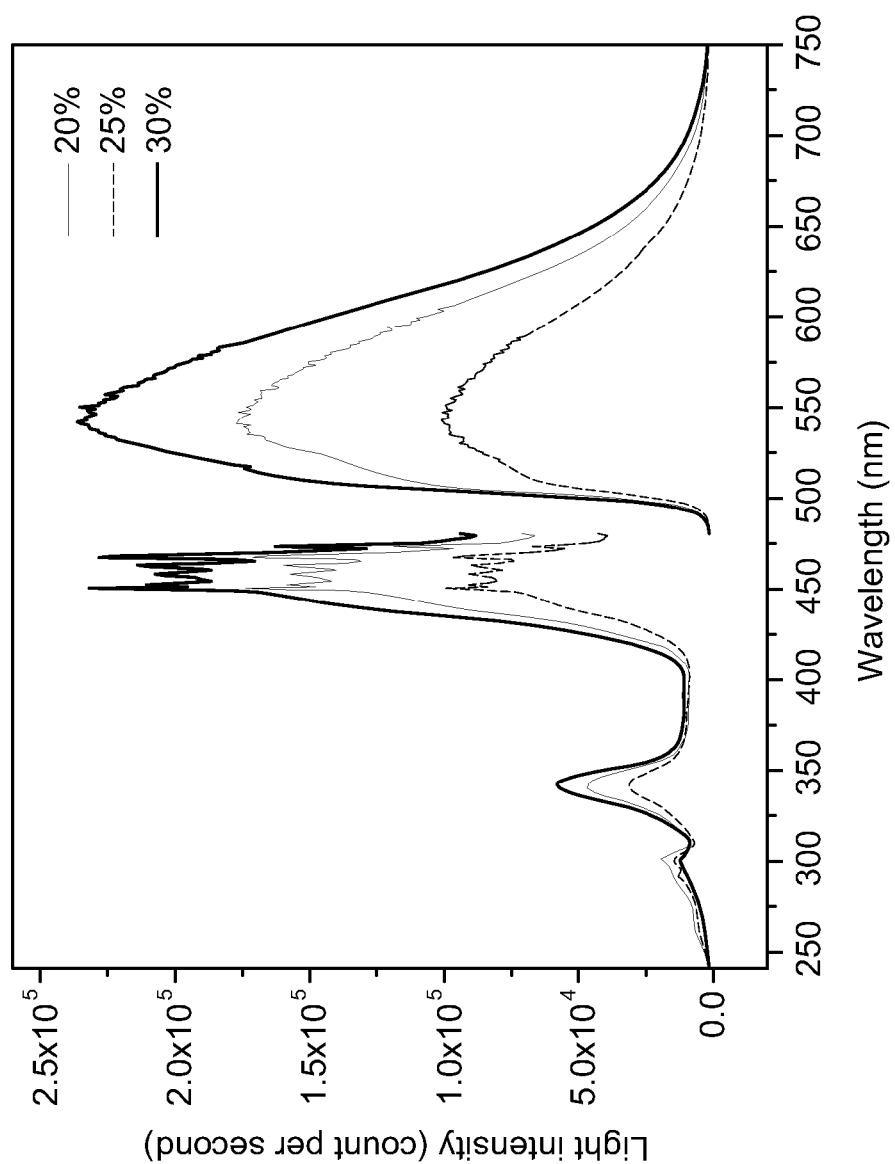
FIG. 3B is a photoluminescence (PL) spectrum of each of the plurality of fluorescent particles having a diameter of 1 μm.
Figure 3C:
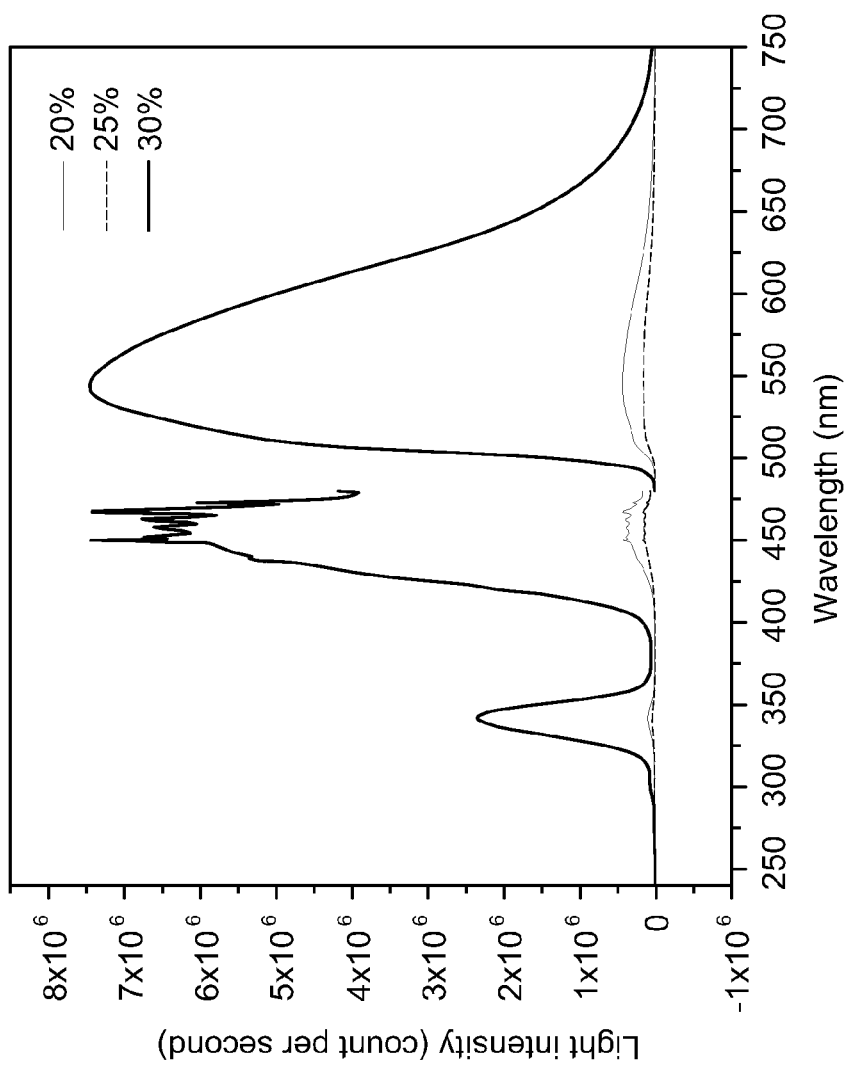
FIG. 3C is a PL spectrum of each of the plurality of fluorescent particles having a diameter of 6 μm to 10 μm.

Moreover, the diameter each of the plurality of fluorescent particles 118 may affect the energy provided by the first light 104 to excite the plurality of fluorescent particles 118. FIG. 3B and FIG. 3C are photoluminescence (PL) spectrums of each of the plurality of fluorescent particles having a diameter of 1 micrometer (µm) and 6 µm, respectively. The plurality of fluorescent particles 118 may be made of YAG, and the fluorescent film 112 may have a uniform thickness. In FIG. 3B and FIG. 3C, the transverse axis represents the wavelength of the first light 104 received by the light mixing module 100, and the longitudinal axis represents the energy provided by the first light 104 to excite the plurality of fluorescent particles 118. The fine line indicates that the volume ratio of the plurality of fluorescent particles 118 and the colloid 121 is 20%, the dashed line indicates that the volume ratio of the plurality of fluorescent particles 118 and the colloid 121 is 25%, and the thick line indicates that the volume ratio of the plurality of fluorescent particles 118 and the colloid 121 is 30%. It can be seen from FIG. 3B and FIG. 3C that, when the volume ratio of the plurality of fluorescent particles 118 having a diameter of 1 μm and the colloid 121 and the volume ratio of the plurality of fluorescent particles 118 having a diameter of 6 μm and the colloid 121 are both 30%, the energy provided by the first light 104 of the same wavelength to excite the plurality of fluorescent particles 118 having a diameter of 6 μm is about 10 to 30 times the energy provided by the first light 104 of the same wavelength to excite the plurality of fluorescent particles 118 having a diameter of 1 μm. That is, when the light mixing module 100 receives the first light 104 of the same wavelength, the energy provided by the first light 104 to excite the fluorescent particles 118 rises along with the increase of the diameter of each of the fluorescent particles 118, wherein the diameter of the fluorescent particle 118 is, for example, in a range of 1 μm to 10 μm.

Figure 3D:
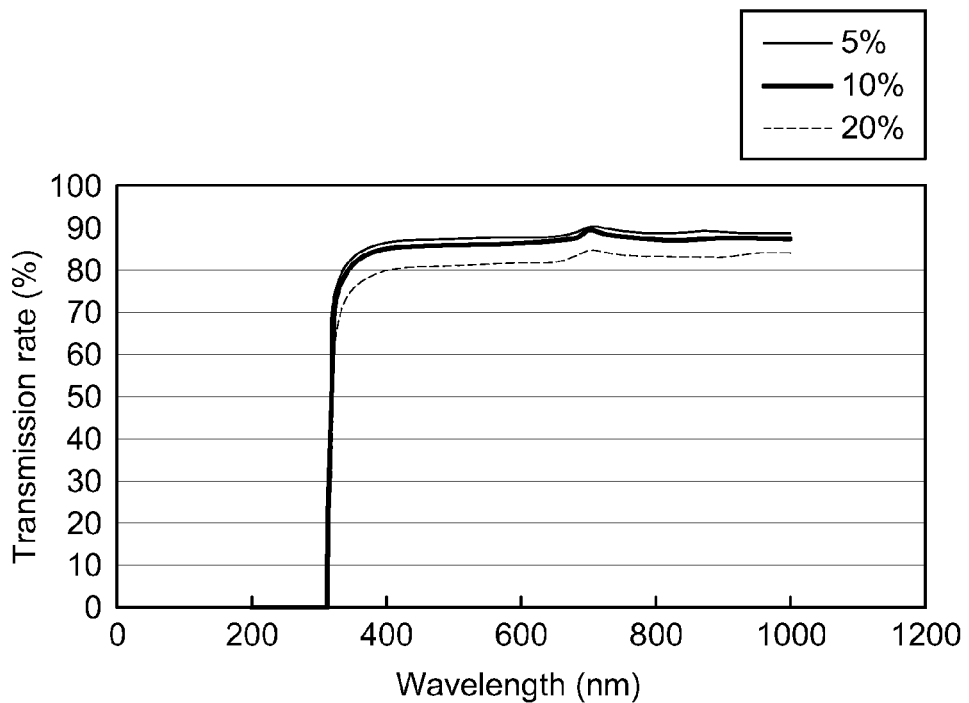
FIG. 3D is a schematic view of relations between a thickness of the fluorescent film of 53 μm and a transmission rate of the fluorescent film.
Figure 3E:
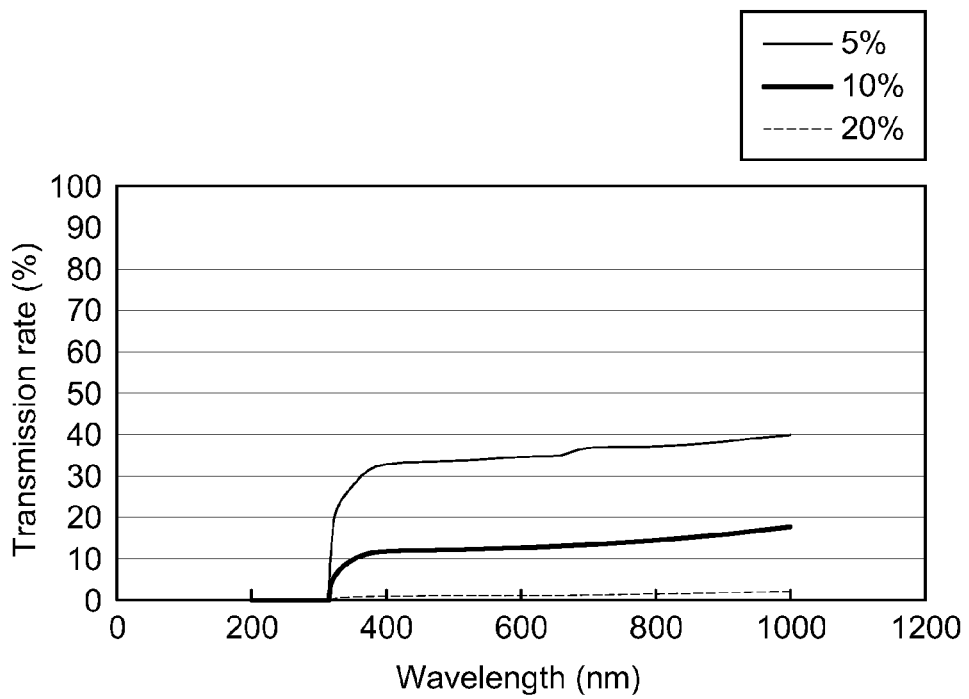
FIG. 3E is a schematic view of relations between a thickness of the fluorescent film of 130 μm and a transmission rate of the fluorescent film.

Moreover, the thickness of the fluorescent film 112 may affect the transmission rate of the fluorescent film 112. FIG. 3D and FIG. 3E are schematic views of relations between the thickness of the fluorescent film of 53 μm and the transmission rate of the fluorescent film and relations between the thickness of the fluorescent film of 130 μm and the transmission rate of the fluorescent film, respectively. The plurality of fluorescent particles 118 may be made of YAG. In FIG. 3D and FIG. 3E, the transverse axis represents the wavelength of the first light 104 received by the light mixing module 100, and the longitudinal axis represents the transmission rate of the fluorescent film 112. The fine line indicates that the volume ratio of the plurality of fluorescent particles 118 and the colloid 121 is 5%, the thick line indicates that the volume ratio of the plurality of fluorescent particles 118 and the colloid 121 is 10%, and the dashed line indicates that the volume ratio of the plurality of fluorescent particles 118 and the colloid 121 is 20%. It can be seen from FIG. 3D and FIG. 3E that, when the volume ratio of the plurality of fluorescent particles 118 and the colloid 121 is 5%, the transmission rate of the fluorescent film 112 having the thickness of 53 μm is 0 to 90%, and the transmission rate of the fluorescent film 112 having the thickness of 130 μm is 0 to 40%. That is, when the light mixing module 100 receives the first light 104 of the same wavelength, the transmission rate of the fluorescent film 112 decreases along with the increase of the thickness of the fluorescent film 112; therefore, the thickness of the fluorescent film 112 is, for example, in a range of 30 μm to 130 μm. The thickness of the fluorescent film 112 may be controlled through a roll-to-roll (R2R) process.

Figure 2B:
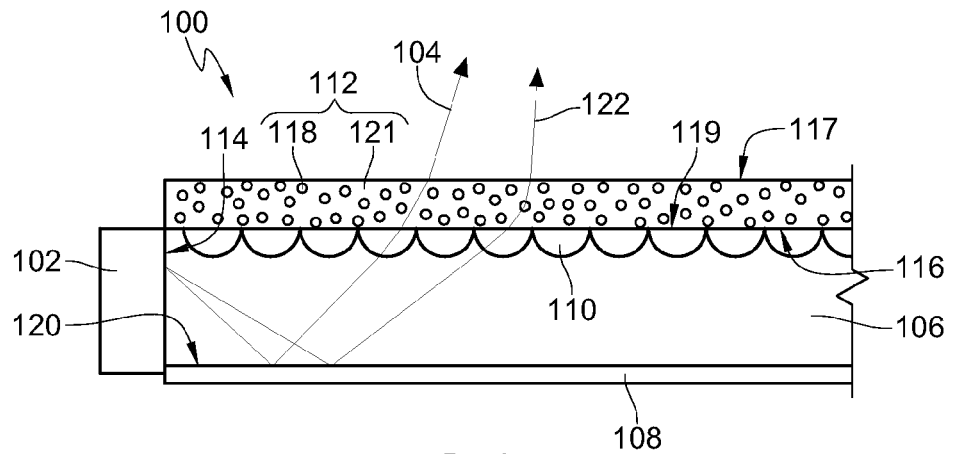
FIG. 2B is a schematic view of the structure of a light mixing module applied in a backlight module of a display device according to a second embodiment.
Figure 2C:
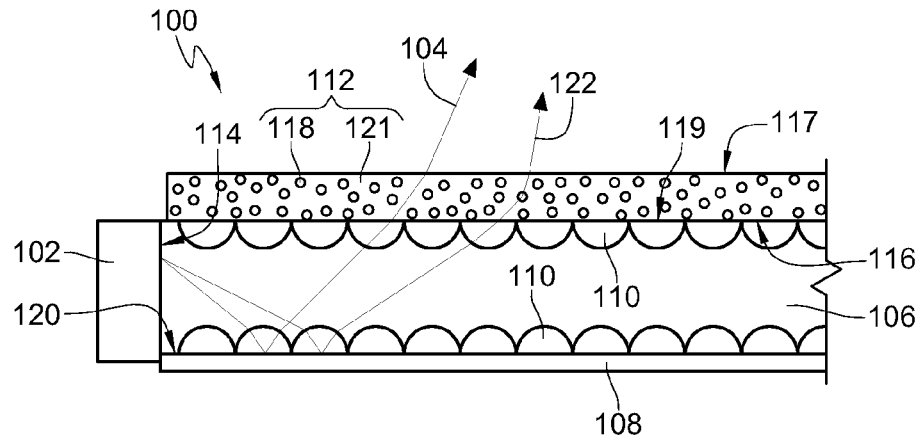
FIG. 2C is a schematic view of the structure of a light mixing module applied in a backlight module of a display device according to a third embodiment.

Further, referring to FIG. 2A, FIG. 2B, and FIG. 2C, the fluorescent film 112 is adhered to the emission surface 116. In other words, the lower surface 119 coincides with the emission surface 116, and the present disclosure is not limited thereto. For example, referring to FIG. 2D, FIG. 2E, and FIG. 2F, the fluorescent film 112 is disposed on or above the emission surface 116, there is an intermediate layer 115 between the fluorescent film 112 and the emission surface 116, and the intermediate layer 115 is made of air or an adhesive.

Figure 4A:
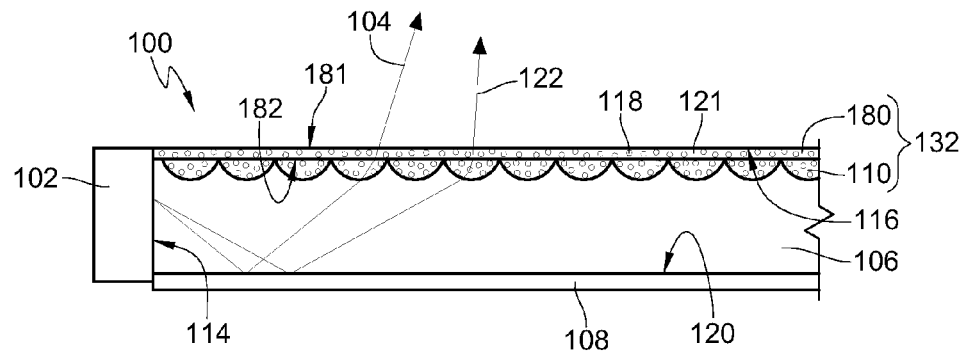
FIG. 4A is a schematic view of the structure of a light mixing module applied in a backlight module of a display device according to a seventh embodiment.
Figure 4B:
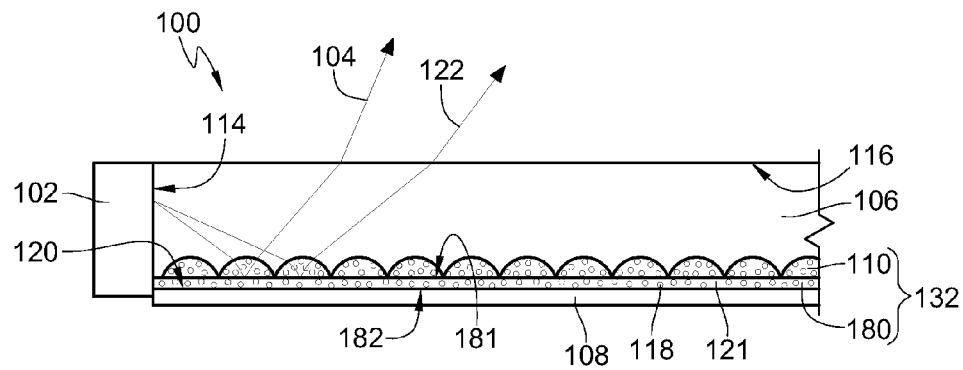
FIG. 4B is a schematic view of the structure of a light mixing module applied in a backlight module of a display device according to a eighth embodiment.
Figure 4C:
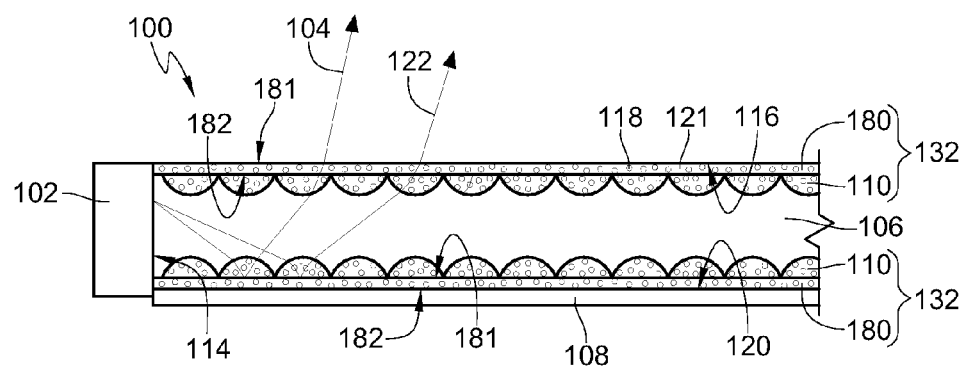
FIG. 4C is a schematic view of the structure of a light mixing module applied in a backlight module of a display device according to a ninth embodiment.
Figure 4D:
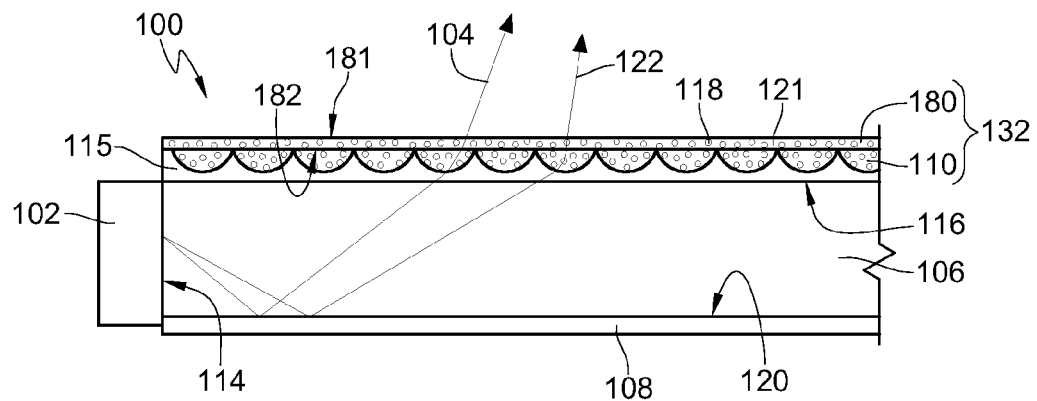
FIG. 4D is a schematic view of the structure of a light mixing module applied in a backlight module of a display device according to a tenth embodiment.
Figure 4E:
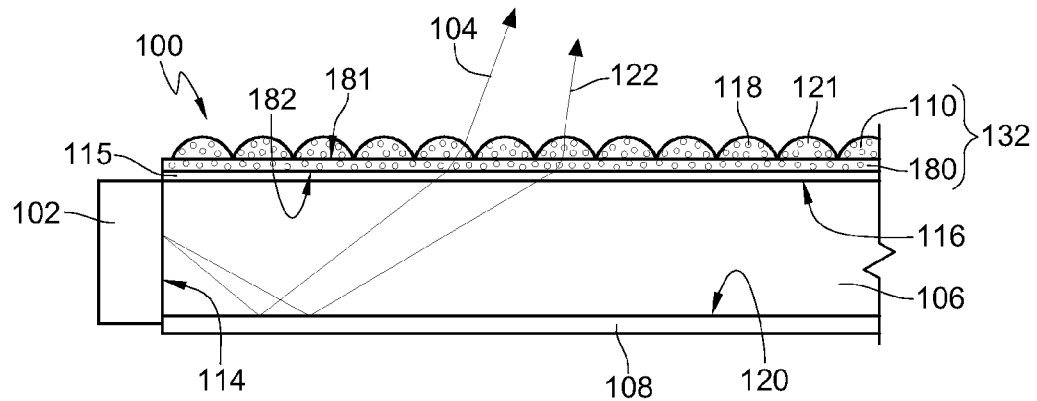
FIG. 4E is a schematic view of the structure of a light mixing module applied in a backlight module of a display device according to an eleventh embodiment.
Figure 4F:
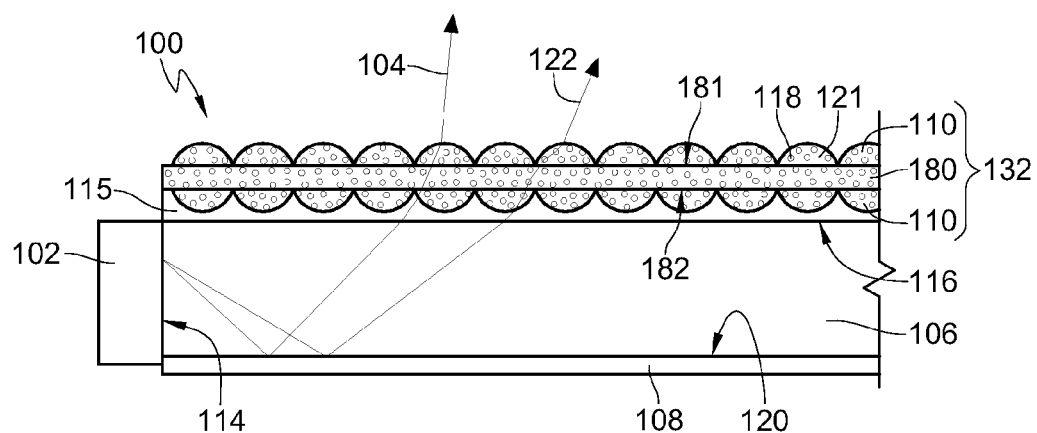
FIG. 4F is a schematic view sectional view of the structure of a light mixing module applied in a backlight module of a display device according to a twelfth embodiment.

Referring to FIG. 4A, FIG. 4B, and FIG. 4C, FIG. 4A is a schematic view of the structure of a light mixing module applied in a backlight module of a display device according to a seventh embodiment, FIG. 4B is a schematic view of the structure of a light mixing module applied in a backlight module of a display device according to a eighth embodiment, and FIG. 4C is a schematic view of the structure of a light mixing module applied in a backlight module of a display device according to a ninth embodiment. The light mixing module 100 includes a matrix 106, a reflecting element 108, a plurality of micro-structures 110, and a fluorescent film 180. The fluorescent film 180 has an upper surface 181 and a lower surface 182. The plurality of micro-structures 110 can be disposed on at least one of the upper surface 181 and the lower surface 182 to form a micro-structure fluorescent film 132, and the micro-structure fluorescent film 132 can be disposed on at least one of the emission surface 116 and the reflective surface 120, and the present disclosure is not limited thereto. For example, referring to FIG. 4D, FIG. 4E and FIG. 4F, FIG. 4D is a schematic view of the structure of a light mixing module applied in a backlight module of a display device according to a tenth embodiment, FIG. 4E is a schematic view of the structure of a light mixing module applied in a backlight module of a display device according to a eleventh embodiment, and FIG. 4F is a schematic view of the structure of a light mixing module applied in a backlight module of a display device according to a twelfth embodiment. In FIG. 4D, FIG. 4E and FIG. 4F, the micro-structure fluorescent film 132 can be disposed on or above the emission surface 116 and there is an intermediate layer 115 between the micro-structure fluorescent film 132 and the emission surface 116, and the intermediate layer 115 is made of air or an adhesive. The plurality of micro-structures 110 may be, but not limited to, arc-top prisms. For example, the plurality of micro-structures 110 may be selected from a group consisting of micro-prisms, flat-top prisms, arc-top prisms, curved prisms, and irregular prisms.

Moreover, the light mixing module 100 in FIG. 4A, FIG. 4B, FIG. 4C, FIG. 4D, FIG. 4E, and FIG. 4F can use the reflecting element 108 which is disposed on the reflective surface 120 to reflect the first light 104 which is incident on the reflective surface 120, and the present disclosure is not limited thereto. For example, the light mixing module 100 which does not have the reflecting element 108 can use the refractive index of the matrix 106 and the refractive index of the external environment to totally reflect the first light 104 which is incident on the reflective surface 120.

In FIG. 4A, FIG. 4B, FIG. 4C, FIG. 4D, FIG. 4E, and FIG. 4F, the plurality of micro-structures 110 may be formed by a colloid 121 containing a specific proportion of the plurality of fluorescent particles 118, and a volume ratio of the plurality of fluorescent particles 118 and the colloid 121 is greater than 0 and smaller than or equal to 30%.

In FIG. 4A, FIG. 4B, FIG. 4C, FIG. 4D, FIG. 4E, and FIG. 4F, The matrix 106 receives the first light 104 from the incidence surface 114, and the reflective surface 120 is used for reflecting the first light 104 received by the incidence surface 114 to make the first light 104 to be emitted from the emission surface 116. The plurality of fluorescent particles 118 of the micro-structure fluorescent film 132 receives a part of the first light 104 and the plurality of fluorescent particles 118 is excited to emit a second light 122 having a second wavelength $\lambda_2$. The plurality of micro-structures 110 of the micro-structure fluorescent film 132 make the light which passes through the micro-structure fluorescent film 132 (that is, the first light 104 or the second light 122) uniform. The second light 122 having the second wavelength $\lambda_2$ and the first light 104 are mixed into a predetermined light which is a visible light. For example, when the color of the first light 104 is complementary to the color of the second light 122 (for example, but not limited to that, the first light 104 is a blue light, and the second light 122 is a yellow light), the light mixing module 100 emits a white light, but the present disclosure is not limited thereto, which can be adjusted according to actual requirements on the predetermined light.

Figure 5:
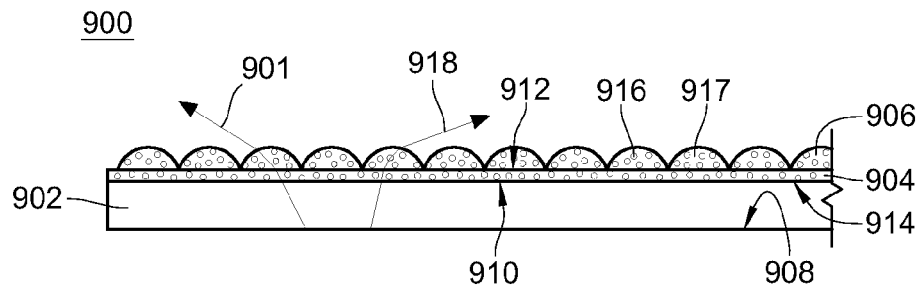
FIG. 5 is a schematic view of the structure of a light mixing module according to another one embodiment.

FIG. 5 is a schematic view of the structure of a light mixing module according to another one embodiment. Referring to FIG. 5, the light mixing module 900 is applied for receiving a first light 901 which has a first wavelength $\lambda_1$. The light mixing module 900 includes a matrix 902, a fluorescent film 904, and a plurality of micro-structures 906. The matrix 902 includes an incidence surface 908 and an emission surface 910 which are opposite to each other. The fluorescent film 904 is disposed on the emission surface 910 and has an upper surface 912 and a lower surface 914 which are opposite to each other, and the present disclosure is not limited thereto. For example, the fluorescent film 904 can be disposed on the incidence surface 908 or above the emission surface 910. The fluorescent film 904 includes a plurality of fluorescent particles 916 and a colloid 917, and may be formed by the colloid 917 containing a specific proportion of the plurality of fluorescent particles 916. Moreover, the plurality of micro-structures 906 can also be formed by the colloid 917 containing a specific proportion of the plurality of fluorescent particles 916.

In this embodiment, the plurality of micro-structures 906 can be disposed on the upper surface 912, and the present disclosure is not limited thereto. For example, the plurality of micro-structures 906 can also be disposed on at least one of the emission surface 910, the incidence surface 908, and the lower surface 914. The incidence surface 908 is used to receive the first light 901, and the emission surface 910 is used to emit the first light 901 received by the incidence surface 908. The plurality of fluorescent particles 916 receives a part of the first light 901 emitted by the emission surface 910, and the plurality of fluorescent particles 916 is excited to emit a second light 918 having a second wavelength $\lambda_2$. The second light 918 having the second wavelength $\lambda_2$ and the first light 901 are mixed into a predetermined light which is a visible light. The plurality of micro-structures 906 is used to make the first light 901 or the second light 918 uniform.

Figure 6A:
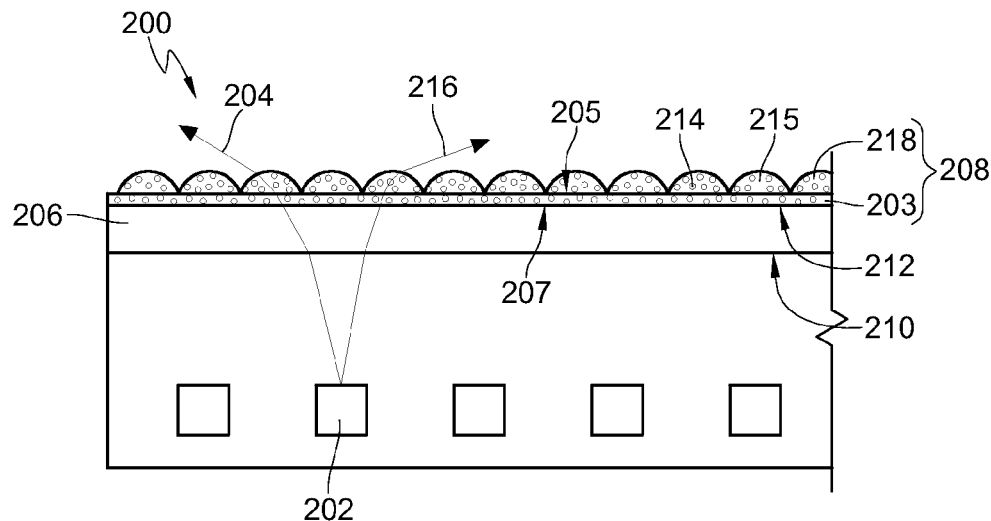
FIG. 6A is a schematic view of the structure of a light mixing module applied in a backlight module of a display device according to a thirteenth embodiment.

FIG. 6A is a schematic view of the structure of a light mixing module applied in a backlight module of a display device according to a thirteenth embodiment. Referring to FIG. 6A, the light mixing module 200 is applied for receiving a first light 204 which has a first wavelength $\lambda_1$ emitted from a light source 202. The number of the light source 202 may be multiple, which is not limited herein. In this embodiment, the number of the light source 202 is five. The light mixing module 200 includes a matrix 206 and a micro-structure fluorescent film 208. The micro-structure fluorescent film 208 includes a plurality of micro-structures 218 and a fluorescent film 203. The matrix 206 includes a first surface 210 and a second surface 212 which are opposite to each other, and the fluorescent film 203 includes an upper surface 205 and a lower surface 207 which are opposite to each other. The fluorescent film 203 and the plurality of micro-structures 218 include a plurality of fluorescent particles 214 respectively, and the plurality of micro-structures 218 is disposed on at least one of the upper surface 205 and the lower surface 207. The fluorescent film 203 and the plurality of micro-structures 218 may be formed by a colloid 215 containing the plurality of fluorescent particles 214 of a specific proportion, and the specific proportion may not be described herein again.

Figure 6B:
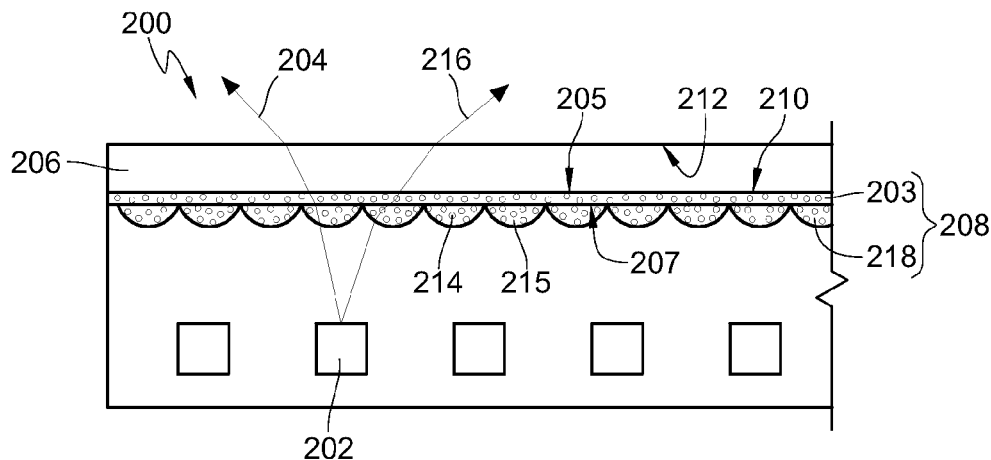
FIG. 6B is a schematic view of the structure of a light mixing module applied in a backlight module of a display device according to a fourteenth embodiment.
Figure 6C:
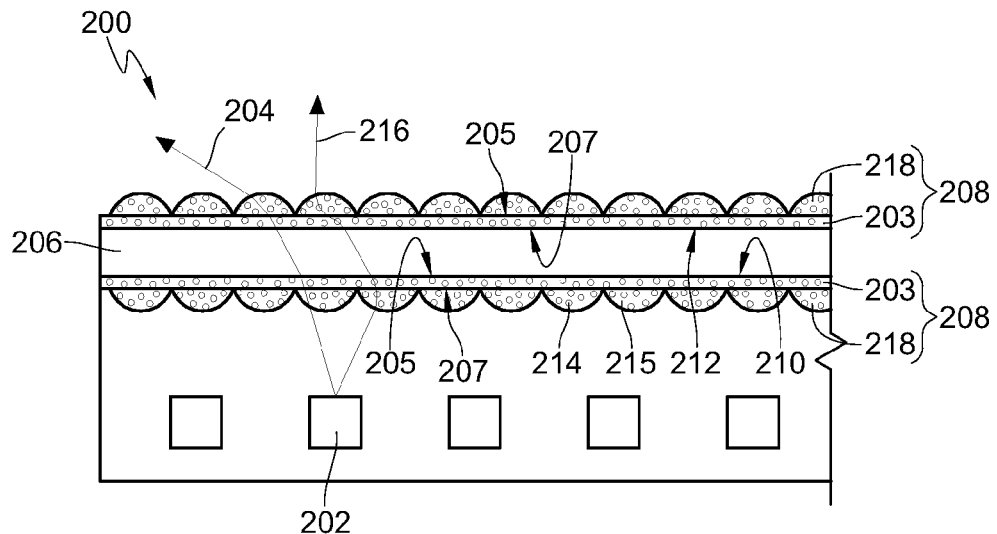
FIG. 6C is a schematic view of the structure of a light mixing module applied in a backlight module of a display device according to a fifteenth embodiment.

In this embodiment, the micro-structure fluorescent film 208 may be disposed on, but not limited to, the second surface 212. For example, the micro-structure fluorescent film 208 may also be disposed on the first surface 210 (referring to FIG. 6B, which is a schematic view of the structure of a light mixing module applied in a backlight module of a display device according to a fourteenth embodiment) or disposed on the first surface 210 and the second surface 212 respectively (referring to FIG. 6C, which is a schematic view of the structure of a light mixing module applied in a backlight module of a display device according to a fifteenth embodiment). The plurality of micro-structures 218 may be, but not limited to, arc-top prisms, that is, the plurality of micro-structures 218 may be selected from a group consisting of micro-prisms, flat-top prisms, arc-top prisms, curved prisms, and irregular prisms.

In this embodiment, the light source 202 is disposed under the first surface 210 of the matrix 206, and the first surface 210 and the second surface 212 are opposite to each other. The first light 204 is incident from the first surface 210 at the bottom of the matrix 206, and emitted from the second surface 212 at the top of the matrix 206.

The first surface 210 of the matrix 206 is used for receiving the first light 204 with the first wavelength $\lambda_1$. Since the matrix 206 can be a diffuser in this embodiment, the matrix 206 is used to make the first light 204 incident on the matrix 206 uniform and emitting the uniform first light 204 from the second surface 212. The plurality of fluorescent particles 214 receives a part of the first light 204 from the second surface 212, and is excited to emit a second light 216 with a second wavelength $\lambda_2$. After the second light 216 with the second wavelength $\lambda_2$ passes through the plurality of micro-structures 218, the second light 216 becomes uniform and is emitted from the light mixing module 200. The second light 216 and the first light 204 are mixed into a predetermined light, and the predetermined light is a visible light. When the color of the first light 204 is complementary to the color of the second light 216 (for example, the first light 204 is, but not limited to, a blue light, and the second light 216 is, but not limited to, a yellow light), the light mixing module 200 emits a white light, but the present disclosure is not limited thereto, which can be adjusted according to actual requirements on the predetermined light.

Figure 6D:
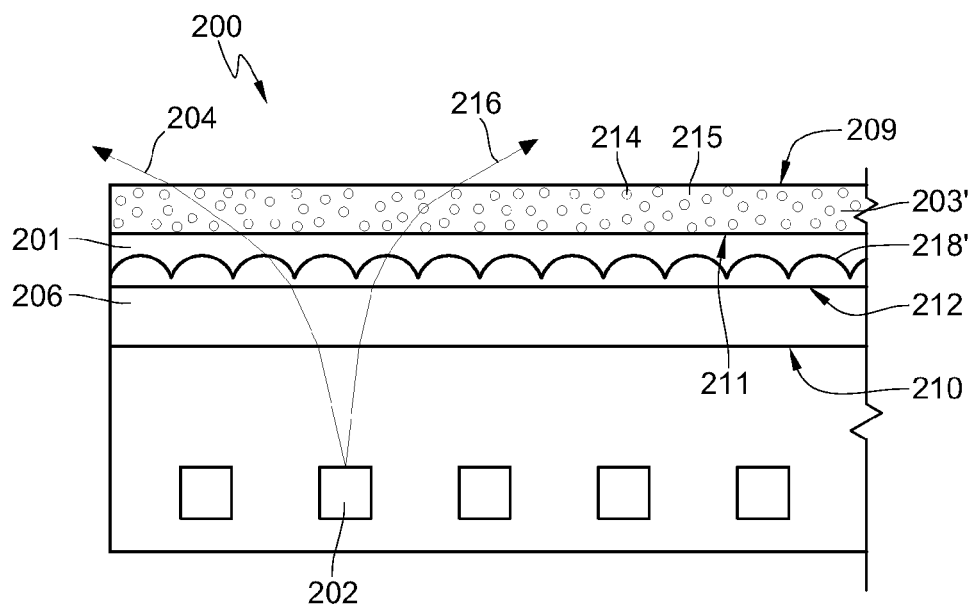
FIG. 6D is a schematic view of the structure of a light mixing module applied in a backlight module of a display device according to a sixteenth embodiment.

FIG. 6D is a schematic view of the structure of a light mixing module applied in a backlight module of a display device according to a sixteenth embodiment. Further, referring to FIG. 6D, the micro-structure fluorescent film 208 may be formed by a plurality of micro-structures 218' and a fluorescent film 203' separated from each other. For example, the plurality of micro-structures 218' can not contain the plurality of fluorescent particles 214, the fluorescent film 203' includes an upper surface 209 and a lower surface 211 which are opposite to each other, and the fluorescent film 203' is disposed on or above the second surface 212. The fluorescent film 203' can be formed by the colloid 215 containing the plurality of fluorescent particles 214 of a specific proportion. In this embodiment, the plurality of micro-structures 218' is disposed on the second surface 212 of the matrix 206. In other embodiments, the plurality of micro-structures 218' may also be disposed on the first surface 210 of the matrix 206 or disposed on the first surface 210 and the second surface 212 respectively, and the present disclosure is not limited thereto. Moreover, there is an intermediate layer 201 between the lower surface 211 of the fluorescent film 203' and the plurality of micro-structures 218', and the intermediate layer 201 is made of air or an adhesive.

Figure 7A:
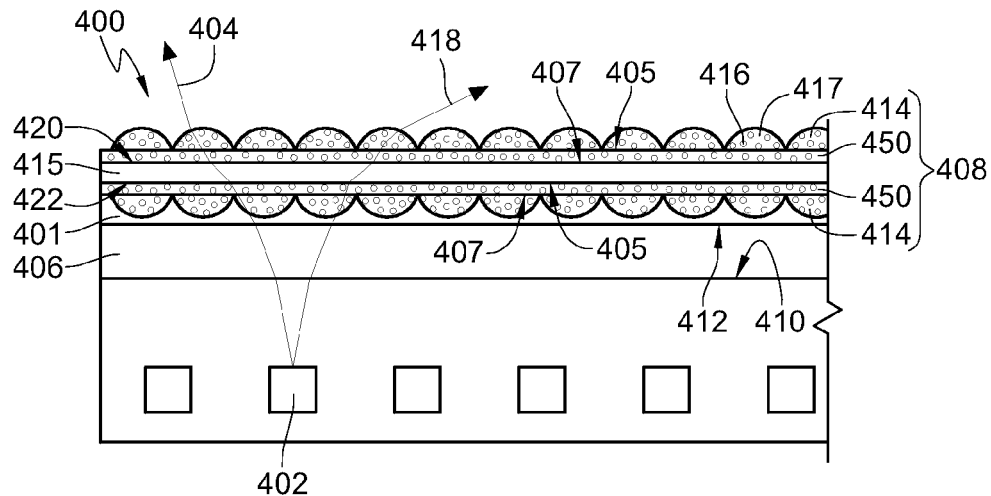
FIG. 7A is a schematic view of the structure of a light mixing module applied in a backlight module of a display device according to a seventeenth embodiment.

FIG. 7A is a schematic view of the structure of a light mixing module applied in a backlight module of a display device according to a seventeenth embodiment. The light mixing module 400 is applied for receiving a first light 404 with a first wavelength $\lambda_1$ emitted from a light source 402. The number of the light source 402 may be, but not limited to, five. The light mixing module 400 includes a matrix 406 and a micro-structure fluorescent film 408. The matrix 406 includes a first surface 410 and a second surface 412. The micro-structure fluorescent film 408 is disposed on or above the second surface 412 of the matrix 406, and the micro-structure fluorescent film 408 includes a plurality of micro-structures 414, two fluorescent films 450 and a body film 415.

The plurality of micro-structures 414 and the two fluorescent films 450 include a plurality of fluorescent particles 416 respectively, and each fluorescent film 450 has an upper surface 405 and a lower surface 407 which are opposite to each other. The plurality of micro-structures 414 is disposed on at least one of the upper surface 405 and the lower surface 407, and may be formed by a colloid 417 containing the plurality of fluorescent particles 416 of a specific proportion, and the specific proportion may not be described herein again. Moreover, there is an intermediate layer 401 between the micro-structure fluorescent film 408 and the matrix 406, and the intermediate layer 401 is made of air or an adhesive.

Figure 7B:
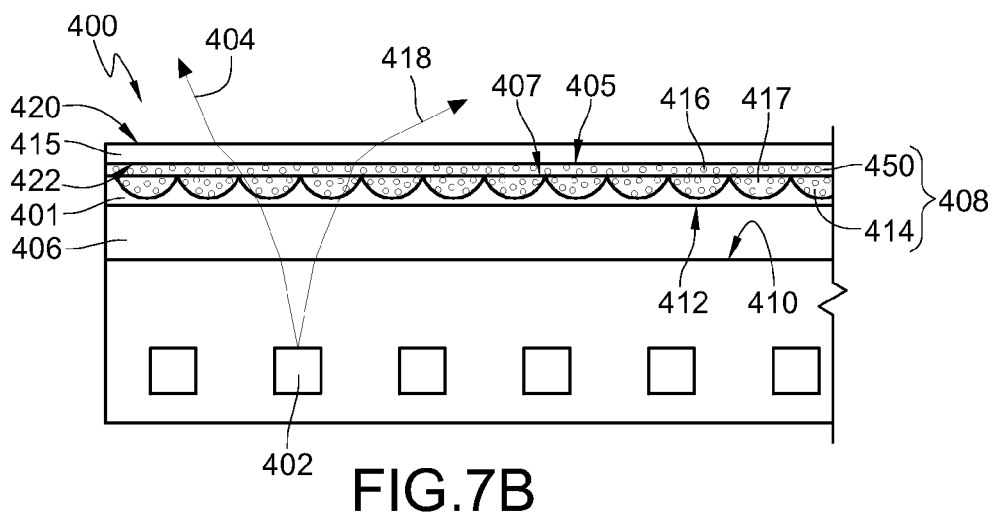
FIG. 7B is a schematic view of the structure of a light mixing module applied in a backlight module of a display device according to a eighteenth embodiment.
Figure 7C:
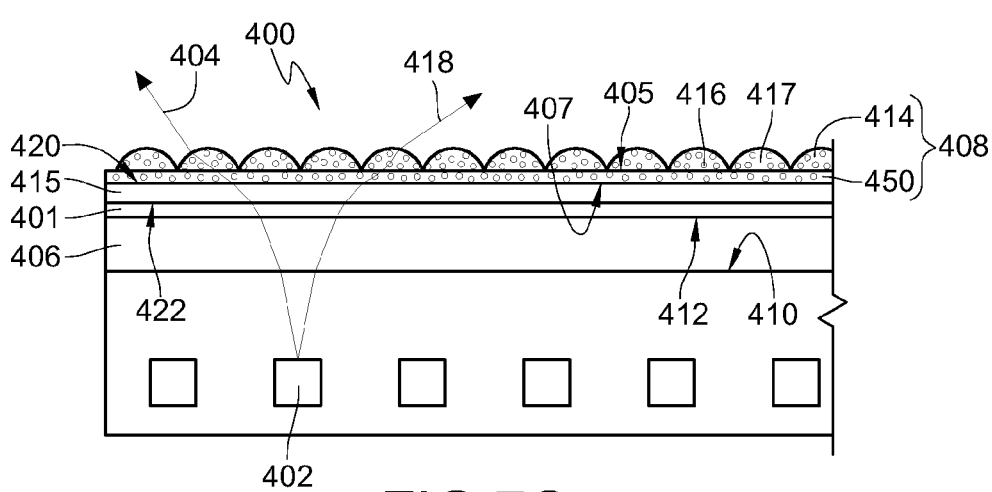
FIG. 7C is a schematic view of the structure of a light mixing module applied in a backlight module of a display device according to a nineteenth embodiment.

In this embodiment, the micro-structure fluorescent film 408 can include two fluorescent films 450, and the body film 415 can have a third surface 420 and a fourth surface 422 which are opposite to each other. The plurality of micro-structures 414 and the two fluorescent films 450 can be disposed on, but not limited to, the third surface 420 and the fourth surface 422, and the present disclosure is not limited thereto. For example, the micro-structure fluorescent film 408 can only include only one fluorescent films 450, and the plurality of micro-structures 414 and the only one fluorescent films 450 may be disposed between the matrix 406 and the body film 415 (that is, the plurality of micro-structures 414 and the only one fluorescent films 450 may be disposed on the fourth surface 422 of the body film 415, referring to FIG. 7B, which is a schematic view of the structure of a light mixing module applied in a backlight module of a display device according to a eighteenth embodiment), or disposed on the third surface 420 opposite to the matrix 406 (referring to FIG. 7C, which is a schematic view of the structure of a light mixing module applied in a backlight module of a display device according to a nineteenth embodiment). The plurality of micro-structures 414 may be, but not limited to, arc-top prisms. For example, the plurality of micro-structures 414 may be selected from a group consisting of micro-prisms, flat-top prisms, arc-top prisms, curved prisms, and irregular prisms.

In this embodiment, the light source 402 is disposed under the first surface 410 of the matrix 406, and the first surface 410 and the second surface 412 are opposite to each other. The first light 404 is incident from the first surface 410 at the bottom of the matrix 406, and emitted from the second surface 412 at the top of the matrix 406.

The first surface 410 of the matrix 406 is used for receiving the first light 404. Since the matrix 406 can be a diffuser in this embodiment, the matrix 406 is used to make the first light 404 incident on the matrix 406 uniform. The plurality of fluorescent particles 416 of the micro-structure fluorescent film 408 receives the uniform first light 404 emitted from the second surface 412 and is excited to emit a second light 418 with a second wavelength $\lambda_2$. The plurality of micro-structures 414 of the micro-structure fluorescent film 408 makes the second light 418 with the second wavelength $\lambda_2$ uniform.

Specifically, when the first light 404 emitted from the light source 402 is received by the light mixing module 400, the matrix 406 receives the first light 404 through the first surface 410 and makes the first light 404 uniform, and the uniform first light 404 is received by the micro-structure fluorescent film 408. The plurality of fluorescent particles 416 of the micro-structure fluorescent film 408 is excited by the uniform first light 404 to emit the second light 418 with the second wavelength $\lambda_2$. Then, the second light 418 with the second wavelength $\lambda_2$ becomes uniform by the plurality of micro-structures 414 and be emitted from the light mixing module 400. The second light 418 with the second wavelength $\lambda_2$ may be mixed with the first light 404 into a predetermined light, and the predetermined light is a visible light. When the color of the first light 404 is complementary to the color of the second light 418 (for example, the first light 404 is, but not limited to, a blue light, and the second light 418 is, but not limited to, a yellow light), the light mixing module 400 emits a white light, but the present disclosure is not limited thereto, which can be adjusted according to actual requirements on the predetermined light.

Figure 2D:
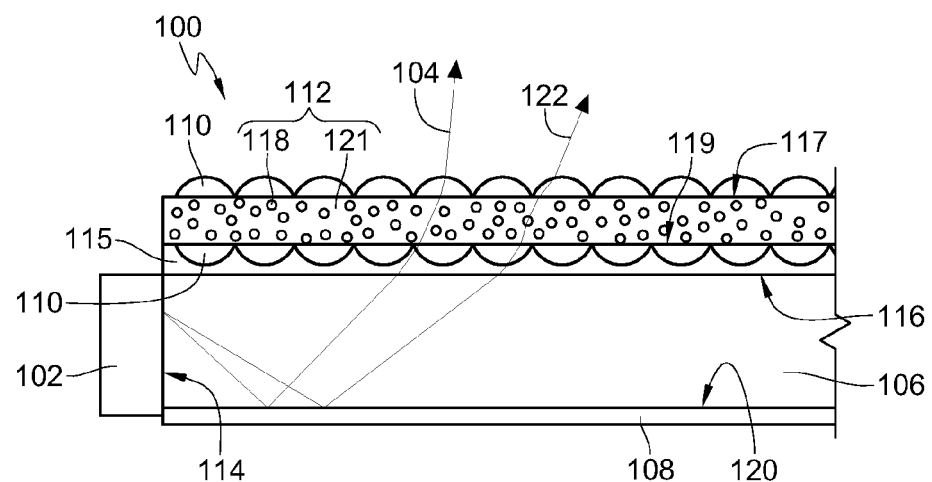
FIG. 2D is a schematic view of the structure of a light mixing module applied in a backlight module of a display device according to a fourth embodiment.
Figure 2E:
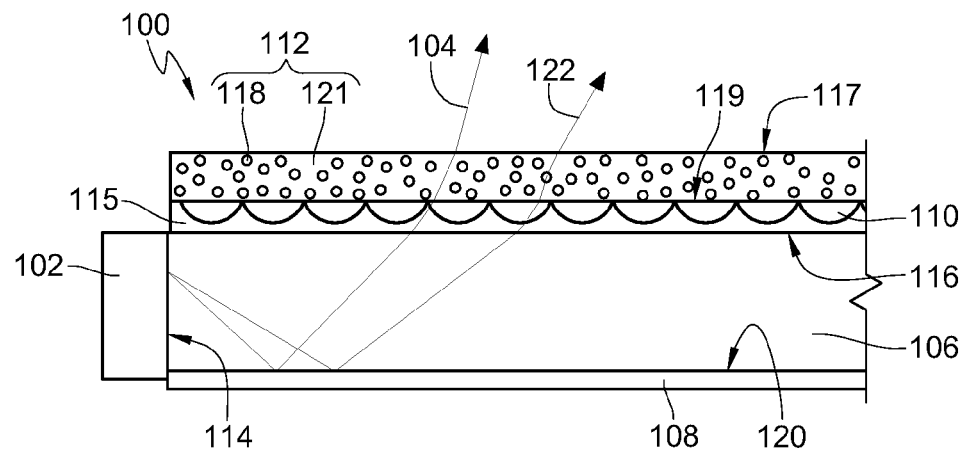
FIG. 2E is a schematic view of the structure of a light mixing module applied in a backlight module of a display device according to a fifth embodiment.
Figure 2F:
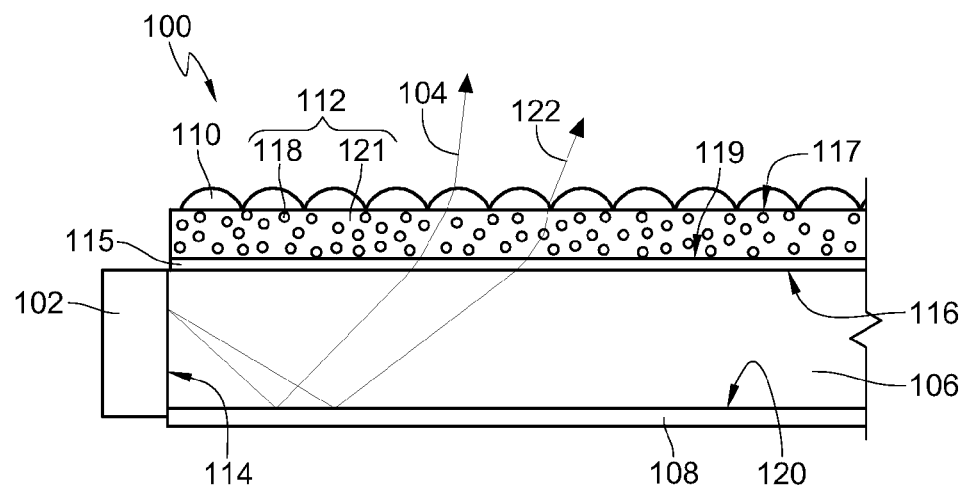
FIG. 2F is a schematic view of the structure of a light mixing module applied in a backlight module of a display device according to a sixth embodiment.

Moreover, the micro-structure fluorescent film 408 in the above embodiment may also be replaced by the plurality of micro-structures 110 and the fluorescent film 112 in FIG. 2D, FIG. 2E, and FIG. 2F, or be replaced by the micro-structure fluorescent film 132 in FIG. 4D, FIG. 4E, and FIG. 4F, and the present disclosure is not limited thereto.

The light mixing modules of the above embodiments are applied for receiving the first light with the first wavelength. By the fluorescent film and the micro-structure fluorescent film which includes the plurality of fluorescent particles, the first light received by the light mixing module is exited to emit the second light with the second wavelength. When the color of the second light with the second wavelength is complementary to the color of the first light received by the light mixing module, the light mixing module emits a white light. Moreover, the plurality of fluorescent particles and the first light can be adjusted according to actual requirements on the predetermined light. Due to the designs of the plurality of fluorescent particles, the plurality of micro-structures, and the matrix, the first light emitted from the light source becomes uniform (that is, a point light source is converted into a line light source or a surface light source). The thickness of the micro-structure fluorescent film or the fluorescent film can be effectively controlled by using the R2R process, and the R2R process facilitates the fabrication of a large-area light mixing module. In addition, by controlling the diameter of each fluorescent particle, the volume ratio of the fluorescent particles and the colloid and the thickness of the fluorescent film, a proper transmission rate of the fluorescent film is obtained.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A light mixing module, applied for receiving a first light which has a first wavelength, including:
   a matrix, including:
      an incidence surface, for receiving the first light;
      an emission surface, adjacent to the incidence surface; and
      a reflective surface, opposite to the emission surface, wherein the reflective surface is used to reflect the first light received by the incidence surface to make the first light to be emitted from the emission surface;
   a fluorescent film, disposed on or above the emission surface, having an upper surface and a lower surface which are opposite to each other and including a plurality of fluorescent particles, wherein the plurality of fluorescent particles receives a part of the first light emitted by the emission surface, the plurality of fluorescent particles is excited to emit a second light having a second wavelength, the second light and the first light are mixed into a predetermined light, and the predetermined light is a visible light; and
   a plurality of micro-structures, disposed on a surface selected from the group consisting of the emission surface, the reflective surface, the upper surface, the lower surface, and combination thereof, wherein the plurality of micro-structures is used to make the first light or the second light uniform, wherein the fluorescent film further includes a colloid, and a volume ratio of the plurality of fluorescent particles and the colloid is greater than 0 and smaller than or equal to 30%.

2. The light mixing module according to claim 1, wherein a thickness of the fluorescent film is 30 micrometer (μm) to 130 μm.

3. The light mixing module according to claim 1, wherein a diameter of each of the plurality of fluorescent particles is 1 μm to 10 μm.

4. The light mixing module according to claim 1, wherein the fluorescent film is glued to the matrix and the fluorescent film is adhered to the emission surface.

5. The light mixing module according to claim 1, wherein there is an intermediate layer between the fluorescent film and the emission surface, and the intermediate layer is made of air or an adhesive.

6. The light mixing module according to claim 1, wherein the plurality of micro-structures includes the plurality of fluorescent particles and the colloid, and a volume ratio of the plurality of fluorescent particles and the colloid is greater than 0 and smaller than or equal to 30%.

7. The light mixing module according to claim 6, wherein a diameter of each of the plurality of fluorescent particles is 1 μm to 10 μm.

8. The light mixing module according to claim 1, wherein the plurality of micro-structures is selected from a group consisting of micro-prisms, flat-top prisms, arc-top prisms, and combination thereof.

9. A light mixing module, applied for receiving a first light which has a first wavelength, including:
 a matrix, including a first surface and a second surface which are opposite to each other, wherein the first surface is used to receive the first light, the second surface is used to emit the first light received by the first surface;
 a fluorescent film, disposed on the first surface or the second surface, wherein the fluorescent film has an upper surface and a lower surface which is opposite to the upper surface and includes a plurality of fluorescent particles, the plurality of fluorescent particles receives a part of the first light emitted by the second surface, the plurality of fluorescent particles is excited to emit a second light having a second wavelength, the second light and the first light are mixed into a predetermined light, and the predetermined light is a visible light; and
 a plurality of micro-structures, disposed on a surface selected from the group consisting of the first surface, the second surface, the upper surface, the lower surface, and combination thereof, wherein the plurality of micro-structures is used to make the first light or the second light uniform,
wherein the fluorescent film further includes a colloid, and a volume ratio of the plurality of fluorescent particles and the colloid is greater than 0 and smaller than or equal to 30%.

10. The light mixing module according to claim 9, wherein a thickness of the fluorescent film is 30 μm to 130 μm.

11. The light mixing module according to claim 9, wherein a diameter of each of the plurality of fluorescent particles is 1 μm to 10 μm.

12. The light mixing module according to claim 9, wherein the fluorescent film is adhered to the first surface or the second surface.

13. The light mixing module according to claim 9, wherein there is an intermediate layer between the fluorescent film and the second surface, and the intermediate layer is made of air or an adhesive.

14. The light mixing module according to claim 9, wherein the plurality of micro-structures includes the plurality of fluorescent particles and the colloid, and a volume ratio of the plurality of fluorescent particles and the colloid is greater than 0 and smaller than or equal to 30%.

15. The light mixing module according to claim 14, wherein a diameter of each of the plurality of fluorescent particles is 1 μm to 10 μm.

16. The light mixing module according to claim 9, wherein the light mixing module further includes a body film, the body film has a third surface and a fourth surface which are opposite to each other, and the fluorescent film is disposed on at least one of the third surface and the fourth surface.

17. The light mixing module according to claim 9, wherein the plurality of micro-structures is selected from a group consisting of micro-prisms, flat-top prisms, arc-top prisms, and combination thereof.

18. A light mixing module, applied for receiving a first light which has a first wavelength, including:
 a matrix, including:
 an incidence surface, for receiving the first light;
 an emission surface, adjacent to the incidence surface; and
 a reflective surface, opposite to the emission surface, wherein the reflective surface is used to reflect the first light received by the incidence surface to make the first light to be emitted from the emission surface;
 a fluorescent film, disposed on or above the emission surface, having an upper surface and a lower surface which are opposite to each other and including a plurality of fluorescent particles, wherein the plurality of fluorescent particles receives a part of the first light emitted by the emission surface, the plurality of fluorescent particles is excited to emit a second light having a second wavelength, the second light and the first light are mixed into a predetermined light, and the predetermined light is a visible light; and
 a plurality of micro-structures, disposed on a surface selected from the group consisting of the emission surface, the reflective surface, the upper surface, the lower surface, and combination thereof, wherein the plurality of micro-structures is used to make the first light or the second light uniform,
wherein the plurality of micro-structures includes the plurality of fluorescent particles and a colloid, and a volume ratio of the plurality of fluorescent particles and the colloid is greater than 0 and smaller than or equal to 30%.

19. The light mixing module according to claim 18, wherein a diameter of each of the plurality of fluorescent particles is 1 μm to 10 μm.

20. A light mixing module, applied for receiving a first light which has a first wavelength, including:
 a matrix, including a first surface and a second surface which are opposite to each other, wherein the first surface is used to receive the first light, the second surface is used to emit the first light received by the first surface;
 a fluorescent film, disposed on the first surface or the second surface, wherein the fluorescent film has an upper surface and a lower surface which is opposite to the upper surface and includes a plurality of fluorescent particles, the plurality of fluorescent particles receives a part of the first light emitted by the second surface, the plurality of fluorescent particles is excited to emit a second light having a second wavelength, the second light and the first light are mixed into a predetermined light, and the predetermined light is a visible light; and a plurality of micro-structures, disposed on a surface selected from the group consisting of the first surface, the second surface, the upper surface, the lower surface, and combination thereof, wherein the plurality of micro-structures is used to make the first light or the second light uniform, wherein the plurality of micro-structures includes the plurality of fluorescent particles and a colloid, and a volume ratio of the plurality of fluorescent particles and the colloid is greater than 0 and smaller than or equal to 30%.

21. The light mixing module according to claim 20, wherein a diameter of each of the plurality of fluorescent particles is 1 μm to 10 μm.

22. A light mixing module, applied for receiving a first light which has a first wavelength, including:

a matrix, including a first surface and a second surface which are opposite to each other, wherein the first surface is used to receive the first light, the second surface is used to emit the first light received by the first surface;

a fluorescent film, disposed on the first surface or the second surface, wherein the fluorescent film has an upper surface and a lower surface which is opposite to the upper surface and includes a plurality of fluorescent particles, the plurality of fluorescent particles receives a part of the first light emitted by the second surface, the plurality of fluorescent particles is excited to emit a second light having a second wavelength, the second light and the first light are mixed into a predetermined light, and the predetermined light is a visible light;

a plurality of micro-structures, disposed on a surface selected from the group consisting of the first surface, the second surface, the upper surface, the lower surface, and combination thereof, wherein the plurality of micro-structures is used to make the first light or the second light uniform; and a body film, wherein the body film has a third surface and a fourth surface which are opposite to each other, and the fluorescent film is disposed on at least one of the third surface and the fourth surface.

* * * * *